US012679131B2

(12) United States Patent (10) Patent No.: US 12,679,131 B2
Fuhse et al. (45) Date of Patent: Jul. 14, 2026

(54) OPTICALLY VARIABLE REPRESENTATION ELEMENT

(71) Applicant: GIESECKE+DEVRIENT CURRENCY TECHNOLOGY GMBH, Munich (DE)

(72) Inventors: Christian Fuhse, Otterfing (DE); Christian Stockl, Gmund a. Tegernsee (DE); Moritz Hofer, Munich (DE); Matthias Blazek, Bad Wiessee (DE); Michael Rahm, Bad Tolz (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 363 days.

(21) Appl. No.: 18/559,955

(22) PCT Filed: May 17, 2022

(86) PCT No.: PCT/EP2022/025231
§ 371 (c)(1),
(2) Date: Nov. 9, 2023

(87) PCT Pub. No.: WO2022/242912
PCT Pub. Date: Nov. 24, 2022

(65) Prior Publication Data
US 2024/0424822 A1 Dec. 26, 2024

(30) Foreign Application Priority Data
May 18, 2021 (DE) ..................... 10 2021 002 599.7

(51) Int. Cl.
*B42D 25/324* (2014.01)
*B42D 25/373* (2014.01)
*G02B 17/00* (2006.01)

(52) U.S. Cl.
CPC ......... *B42D 25/324* (2014.10); *G02B 17/002* (2013.01); *B42D 25/373* (2014.10)

(58) Field of Classification Search
CPC .. B42D 25/324; B42D 25/373; G02B 17/002; G02B 17/00
(Continued)

(56) References Cited

U.S. PATENT DOCUMENTS 9,176,266 B2 11/2015 Fuhse et al.
9,987,873 B2 6/2018 Petiton et al.
(Continued)

FOREIGN PATENT DOCUMENTS

CN 104385800 A 3/2015
CN 108656782 A 10/2018
(Continued)

OTHER PUBLICATIONS

German Search Report from corresponding DE Application No. 102021002599.7, Feb. 23, 2022.
(Continued)

*Primary Examiner* — Justin V Lewis
(74) *Attorney, Agent, or Firm* — Workman Nydegger

(57) ABSTRACT

An optically variable representation element with a reflective surface region generates a respective three-dimensional representation for at least two different observation directions. The reflective surface region contains a respective multiplicity of reflective facets in a first and a second partial region, which at least partially overlap one another. The reflective facets are oriented such that the facets in the first partial region generate a first three-dimensional representation from the first observation direction and the facets in the second partial region generate a second three-dimensional representation from the second observation direction. The facets of the reflective surface region are provided at least
(Continued)

regionally with sub-wavelength structures which generate the different colors of the three-dimensional representations in the overlap region.

18 Claims, 3 Drawing Sheets

(58) Field of Classification Search
 USPC .................. 283/72, 74, 91, 94, 98, 108, 901
 See application file for complete search history.

(56) References Cited

U.S. PATENT DOCUMENTS

| | | | |
|---|---|---|---|
| 10,029,506 B2 | 7/2018 | Fuhse | |
| 10,186,175 B2 | 1/2019 | Koda et al. | |
| 10,343,443 B2 | 7/2019 | Petiton et al. | |
| 10,421,308 B2 | 9/2019 | Zhang et al. | |
| 10,525,758 B2 | 1/2020 | Fuhse et al. | |
| 10,870,305 B2 | 12/2020 | Fuhse et al. | |
| 11,427,025 B2 | 8/2022 | Mimita et al. | |
| 11,623,465 B2 | 4/2023 | Scherer et al. | |
| 11,654,709 B2 | 5/2023 | Scherer et al. | |
| 2012/0319395 A1 | 12/2012 | Fuhse et al. | |
| 2013/0052373 A1 | 2/2013 | Noizet et al. | |
| 2015/0258838 A1 | 9/2015 | Fuhse | |
| 2017/0021660 A1 | 1/2017 | Petiton et al. | |
| 2017/0225502 A1 | 8/2017 | Sauvage-Vincent | |
| 2017/0239972 A1 | 8/2017 | Zhang et al. | |
| 2017/0326898 A1 | 11/2017 | Koda | |
| 2017/0355213 A9 | 12/2017 | Petiton et al. | |
| 2018/0244099 A1 | 8/2018 | Petiton et al. | |
| 2021/0070091 A1 | 3/2021 | Holmes | |
| 2021/0268825 A1 | 9/2021 | Scherer et al. | |
| 2021/0283939 A1* | 9/2021 | Scherer | B42D 25/351 |
| 2023/0057603 A1 | 2/2023 | Fuhse | |

FOREIGN PATENT DOCUMENTS

| | | | | | |
|---|---|---|---|---|---|
| CN | 112572015 A | 3/2021 | | | |
| DE | 102010047250 A1 | 6/2011 | | | |
| DE | 102010049831 A1 | 5/2012 | | | |
| DE | 102015016751 A1 | 6/2017 | | | |
| DE | 102020000027 A1 | 7/2021 | | | |
| EP | 3000614 A1 | 3/2016 | | | |
| EP | 3184318 A1 | 6/2017 | | | |
| EP | 3208099 A1 | 8/2017 | | | |
| EP | 3339048 A1 | 6/2018 | | | |
| EP | 3367140 A1 | 8/2018 | | | |
| EP | 3401712 A1 | 11/2018 | | | |
| FR | 3019497 A1 | 10/2015 | | | |
| WO | 2011066990 A2 | 6/2011 | | | |
| WO | 2011066991 A2 | 6/2011 | | | |
| WO | 2012000669 A1 | 1/2012 | | | |
| WO | 2014060089 A2 | 4/2014 | | | |
| WO | 2015147283 A1 | 10/2015 | | | |
| WO | 2015154943 A1 | 10/2015 | | | |
| WO | 2017011476 A1 | 1/2017 | | | |
| WO | 2018201208 A1 | 11/2018 | | | |
| WO | 2019140527 A1 | 7/2019 | | | |
| WO | 2020011390 A1 | 1/2020 | | | |
| WO | WO-2020011391 A1 * | 1/2020 | ......... | G02B 27/4272 |
| WO | 2020095049 A1 | 5/2020 | | | |
| WO | 2020112064 A1 | 6/2020 | | | |
| WO | 2021063126 A1 | 4/2021 | | | |
| WO | 2021155999 A1 | 8/2021 | | | |

OTHER PUBLICATIONS

International Search Report from corresponding PCT Application No. PCT/EP2022/025231, Sep. 23, 2023.

* cited by examiner

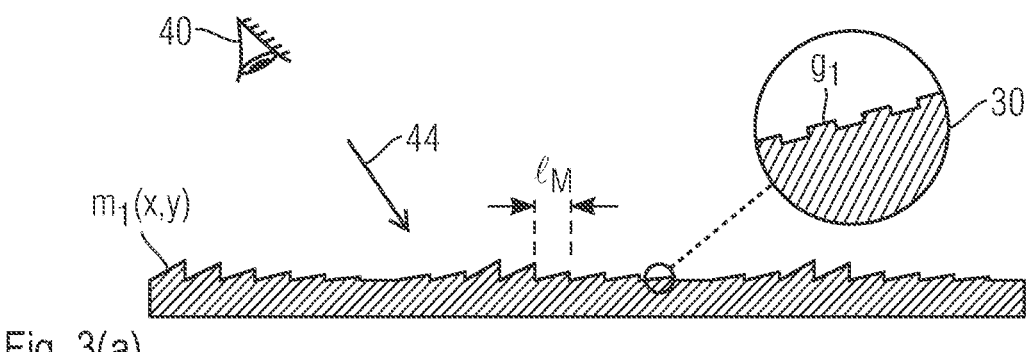
Fig. 3(a)
Fig. 3(b)
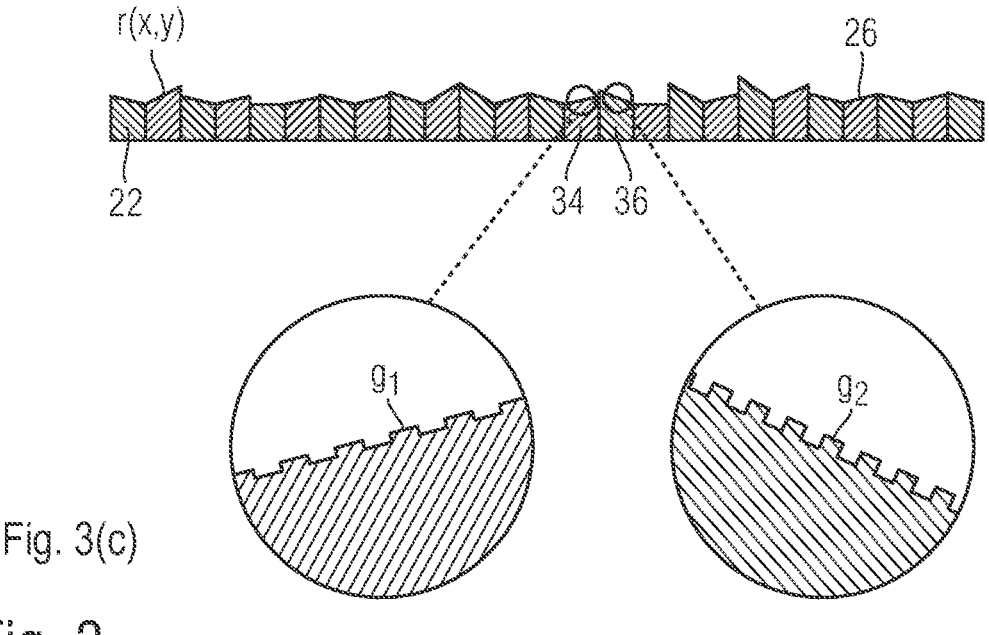
Fig. 3(c)
Fig. 3

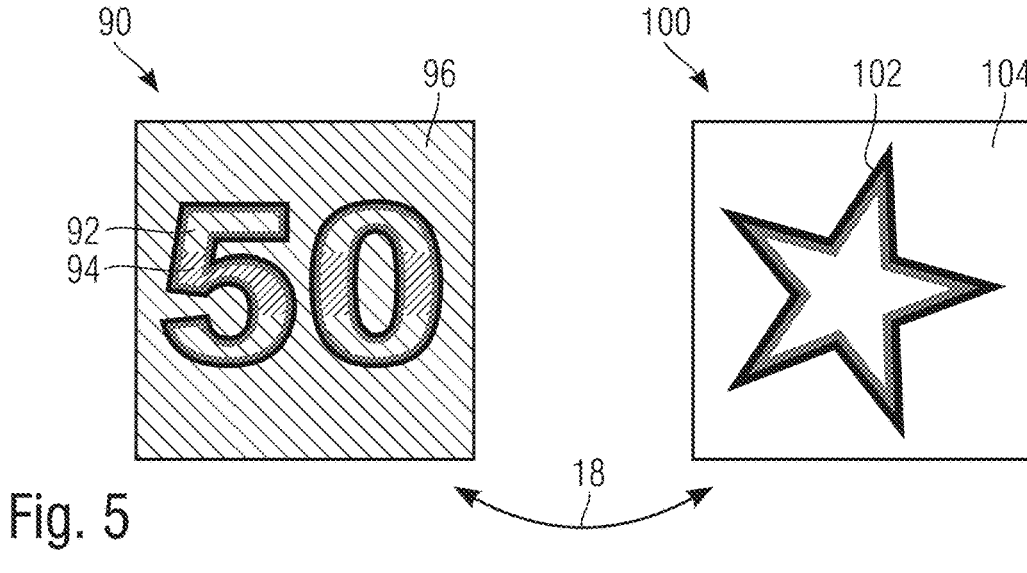
Fig. 4
Fig. 5
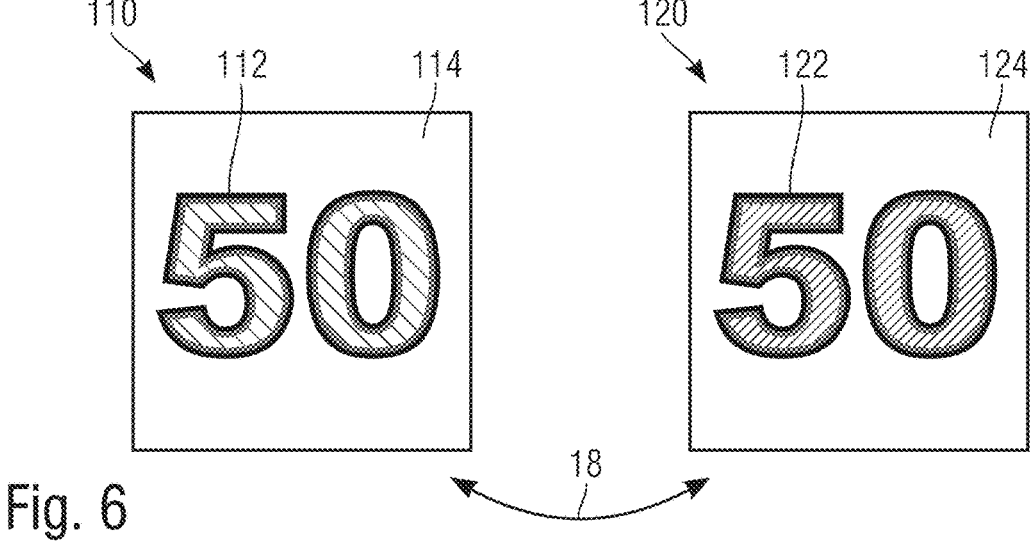
Fig. 6

OPTICALLY VARIABLE REPRESENTATION ELEMENT

BACKGROUND

The invention relates to an optically variable representation element having a reflective surface region, which can be used as a security element for securing value objects or as a decorative element, for example, for the surface design of products.

Data carriers, such as value documents or identification documents, but also other value objects, such as trademark articles, are often provided with security elements for security, which permit the authenticity of the data carrier to be checked and are used at the same time as a protection from unauthorized reproduction. Security elements having observation angle-dependent or three-dimensional appearance play a special role in securing authenticity, since they cannot be reproduced even using the most modern copier devices. For this purpose, the security elements are equipped with optically variable elements which convey a different image impression to the observer at different observation angles and, for example, show a different color or brightness impression and/or a different graphic motif depending on the observation angle.

Movement effects, pump effects, depth effects, or flip effects are described in the prior art here as optically variable effects, for example, which are implemented with the aid of holograms, micro lenses, or micromirrors.

Generating observation angle-dependent bulging effects with the aid of micromirrors is known, for example, from the document WO 2014/060089 A2. Some time ago, more complex, optically variable security elements were proposed, which include two relief structures arranged at different height levels and each provided with a color coating (see WO 2020/011390 A1, WO 2020/011391 A1, and WO 2020/011391 A2). The color coating of the higher-lying relief structure is either structured as a grid or provided with recesses here, so that upon the observation of the security element, the color coating of the lower-lying relief structure appears in the grid gaps or recesses.

SUMMARY

Proceeding therefrom, the invention is based on the object of specifying optically variable representation elements having an attractive visual appearance, which can be produced cost-effectively and ideally moreover have a high level of security from forgery.

To achieve the mentioned object, the invention includes an optically variable representation element having at least one reflective surface region, which generates a three-dimensional representation in each case upon observation in reflected light for at least two different observation directions. The three-dimensional representations at least partially overlap and include different colors at least in some regions in the overlap region.

The at least one reflective surface region contains a plurality of reflective facets for this purpose in each case in a first and a second subregion, which at least partially overlap one another, which facets are oriented so that on the one hand the facets of the first subregion for the observer from the first observation direction create a first three-dimensional representation having a surface that protrudes and/or is set back in relation to its actual spatial shape, and that on the other hand the facets of the second subregion for the observer from the second observation direction create a second three-dimensional representation having a surface that protrudes and/or is set back in relation to its actual spatial shape.

The representation generated for the observer having a surface that protrudes and/or is set back is understood here in particular to mean that the subregion is perceptible as a continuously curved surface.

The representations appearing curved in the sense existing here imitate a curvature in this case by simulating the reflection behavior of a curved surface. In this way, a depth impression or a 3D impression first indirectly results. This impression can therefore also be designated as a "2½-" dimensional representation or relief-type representation.

The facets of the reflective surface region are provided at least in some regions with subwavelength structures here in the overlap region of the first and second subregion, which create the different colors of the three-dimensional representations.

In one advantageous embodiment, the facets of the reflective surface region are provided with a reflection-enhancing coating, in particular with a metallization, a highly-refractive layer, and/or a thin-film structure. Both the facets of the first subregion and the facets of the second subregion are provided here with the reflection-enhancing coating. The metallization can be formed, for example, by Al, Ag, Cr, Cu, Fe, or an alloy of the mentioned metals. For example, a ZnS layer can be provided as a highly-refractive layer. In particular color-changing systems having a structure absorber/dielectric/reflector or symmetrical semitransparent absorber/dielectric/absorber structures come into consideration as thin-film structures.

The facets of the reflective surface region are advantageously formed in an embossing lacquer layer, in particular a thermoplastic or radiation-curing embossing lacquer layer. The use of a UV-curing embossing lacquer layer is particularly advantageous. The arrangement of the facets including the subwavelength structures is embossed here in the embossing lacquer layer and the embossed structure is preferably coated using the mentioned reflection-enhancing coating. The embossed and preferably coated embossed structure is advantageously embedded in a further lacquer layer, for example a protective lacquer layer.

The facets of the reflective surface region are particularly preferably formed by a micromirror arrangement having directed reflective micromirrors, in particular by micromirrors having a linear dimension between 3 μm and 100 μm, preferably between 5 μm and 50 μm. The micromirrors can in particular have a triangular, square, rectangular, hexagonal, or another polygonal footprint. The pitch height of the micromirrors is preferably less than 15 μm, preferably less than 10 μm.

The subwavelength structures are advantageously formed by periodic structures having a period length between 100 nm and 500 nm, preferably between 200 nm and 400 nm, and/or a depth between 50 nm and 400 nm, preferably between 100 nm and 300 nm. The aspect ratio of such structures, thus the ratio between the width of an elevation or depression and the corresponding structure depth, can advantageously be between ¼ and 4, preferably between ⅓ and 3, and particularly preferably between ½ and 2.

To be able to generate particularly clear and pure colors, the period length of the subwavelength structures and the linear dimensions of the micromirrors are preferably matched to one another, so that at least 10, preferably at least 20 complete periods of the subwavelength structures have space on each micromirror.

In addition to periodic structures, aperiodic structures can also be used, in which accordingly the mean center-to-center distances of the subwavelength structures are advantageously between 100 and 500 nm, preferably between 200 and 400 nm.

In one advantageous embodiment, the subwavelength structures are formed by one-dimensional grids, which can also have a polarizing effect. In another, also advantageous design, the subwavelength structures are formed by two-dimensional grids, in particular having rectangular, square, hexagonal, or parallelogram-shaped grid symmetry. The subwavelength structures can in particular be formed by crossed sinusoidal grids, crossed rectangular grids, hexagonal grid structures, or by nanodot or nanohole arrays.

In particular sinusoidal grids, rectangular grids (binary structures), or also profile shapes having concave and/or convex sections come into consideration as profile shapes for the subwavelength structures. Periodic arrangements of nanoholes or nanodots having arbitrary outline shape can also be used. In addition to regular arrangements, the use of irregularly arranged structures is also possible, which can be arranged, for example, randomly distributed or quasi-periodically, and can be characterized by the parameters outline shape, depth, profile shape (for example, binary or other shapes having concave and/or convex sections). In principle, structures as are described in the documents EP 3 367 140 A1 and EP 3 401 712 A1 are also possible, the content of the disclosure of which is insofar incorporated in the present application.

In the reflective surface region, in particular in the overlap region, at least two different subwavelength structures are advantageously provided for generating the different colors, which differ in particular in their period length and/or their depth and/or their profile shape (for example, due to different ratios of web width and trench width).

The subwavelength structures for the different colors of the three-dimensional representations are advantageously arranged in register with the facets of the reflective surface region, so that each facet is only covered with a specific type of subwavelength structures. However, it is fundamentally also possible that the color boundaries extend independently of the facet subdivision of the surface region, so that there can also be facets having various subwavelength structures.

The colors visible to an observer upon the observation of the representation element are each generated in one preferred design by a specific type of subwavelength structures, which is characteristic for this color. Alternatively, the colors visible upon observation of the representation element to an observer can also contain mixed colors, which arise due to color mixing of colors of pixel-shaped subregions having a dimension below the resolution limit of the human eye. The colors of the pixel-shaped subregions are each generated by a specific type of subwavelength structures which is characteristic for this color. The subregions preferably have a dimension here below 150 μm, in particular below 100 μm. A pixel-shaped region or a "pixel" does not necessarily have to be provided here as a rectangular or square region on a right-angled grid, but rather can also designate a differently shaped subregion, which can result, for example, from a mosaic-like surface division.

In one advantageous embodiment, in the overlap region, both the facets of the first subregion and the facets of the second subregion are provided at least in some regions with subwavelength structures, which generate the different colors of the three-dimensional representation. Alternatively, one of the different colors can also be formed by the color of a coating of the facets without a participation of subwavelength structures, in particular by the color of a silver-colored, gold-colored, bronze-colored, or copper-colored metallization, a highly-refractive layer appearing white or colored, or a colored multilayered interference coating. White and the metallic colors of a metal coating also represent colors in the scope of this description. At least one of the different colors of the three-dimensional representations is always generated by the subwavelength structures of the facets, however.

In one advantageous embodiment, the three-dimensional representations have different shapes and/or sizes, so that the observer perceives different spatial motifs from the at least two different observation directions.

In another embodiment, which is also advantageous, the three-dimensional representations have the same shape and size and are arranged congruently, so that the three-dimensional representations from the at least two different observation directions only differ due to the different color in at least some regions.

To overlap the subregions, the first and second subregion are advantageously interleaved in one another, for which purpose the subregions are preferably formed by narrow strips arranged alternately adjacent to one another, or by small partial regions interleaved in one another in two dimensions. The strips or partial regions advantageously have a dimension less than 300 μm, in particular of 100 μm or less, in particular of 50 μm or less in at least one direction here. For example, square partial regions of a dimension of 100 μm×100 μm can be interleaved in one another like a chessboard, wherein the "white chess squares" represent partial regions of the first subregion, the "black chess squares" represent partial regions of the second subregion. The partial regions can also have a complex outline shape and can form the tiles of a parquet in the plane.

It is apparent that the strips or partial regions of the first or second subregion generally each contain a plurality of facets of the associated subregion. For example, square partial regions having dimensions of 100 μm×100 μm each contain 100 facets or micromirrors of a footprint of 10 μm×10 μm. In the extreme case, however, each partial region can also only consist of a single facet or a single micromirror.

The representation element preferably contains precisely two views for two different observation directions. With only two views, the two views can both appear very bright and can be clearly separated. However, designs having three, four, or more views for a corresponding number of observation directions are also possible, wherein the brightness of the individual views decreases with increasing number of views, however, and the associated observation directions move closer together.

It has proven to be advantageous to select the colors of the three-dimensional representations so that they are easy to notice for an observer or are immediately apparent, for example, a motif of a rose having red petals and green stem. Other examples are motifs having blue water drops, golden stars, white snowflakes, red-yellow-green traffic signals, red hearts, or green cloverleafs.

The representation element is advantageously a security element for securing value objects, in particular a security thread, a tear-open thread, a security band, a security strip, a patch, or a label for application to a security paper, value document, or the like.

The representation element can also be used as a decorative element for surface design of a product, for example for the interior design of a motor vehicle or for the surface design of electrical appliances or pieces of furniture.

The invention also includes a data carrier, which includes a representation element of the described type as a security element. The data carrier can in particular be a value document, such as a banknote, in particular a paper banknote, a polymer banknote, or a film composite banknote, a stock share, a bond, a deed, a certificate, a check, a seal, a tax label, a high-value ticket, but also an identification card, such as a credit card, a bank card, a debit card, an authorization card, personal identification, or a passport personalization page.

BRIEF DESCRIPTION OF THE DRAWINGS

Further exemplary embodiments and advantages of the invention will be explained hereinafter on the basis of the figures, in the illustration of which a reproduction to scale and proportionally was omitted in order to enhance the visibility.

In the figures:

FIG. 4 shows the first and second view of a security element according to another exemplary embodiment of the invention, FIG. 5 shows the first and second view of a security element according to a further exemplary embodiment of the invention, and FIG. 6 shows the first and second view of a security element according to a further exemplary embodiment of the invention, in which the shape and size of the two represented three-dimensional motifs are identical.

DETAILED DESCRIPTION OF VARIOUS EMBODIMENTS

Figures 1, 2:
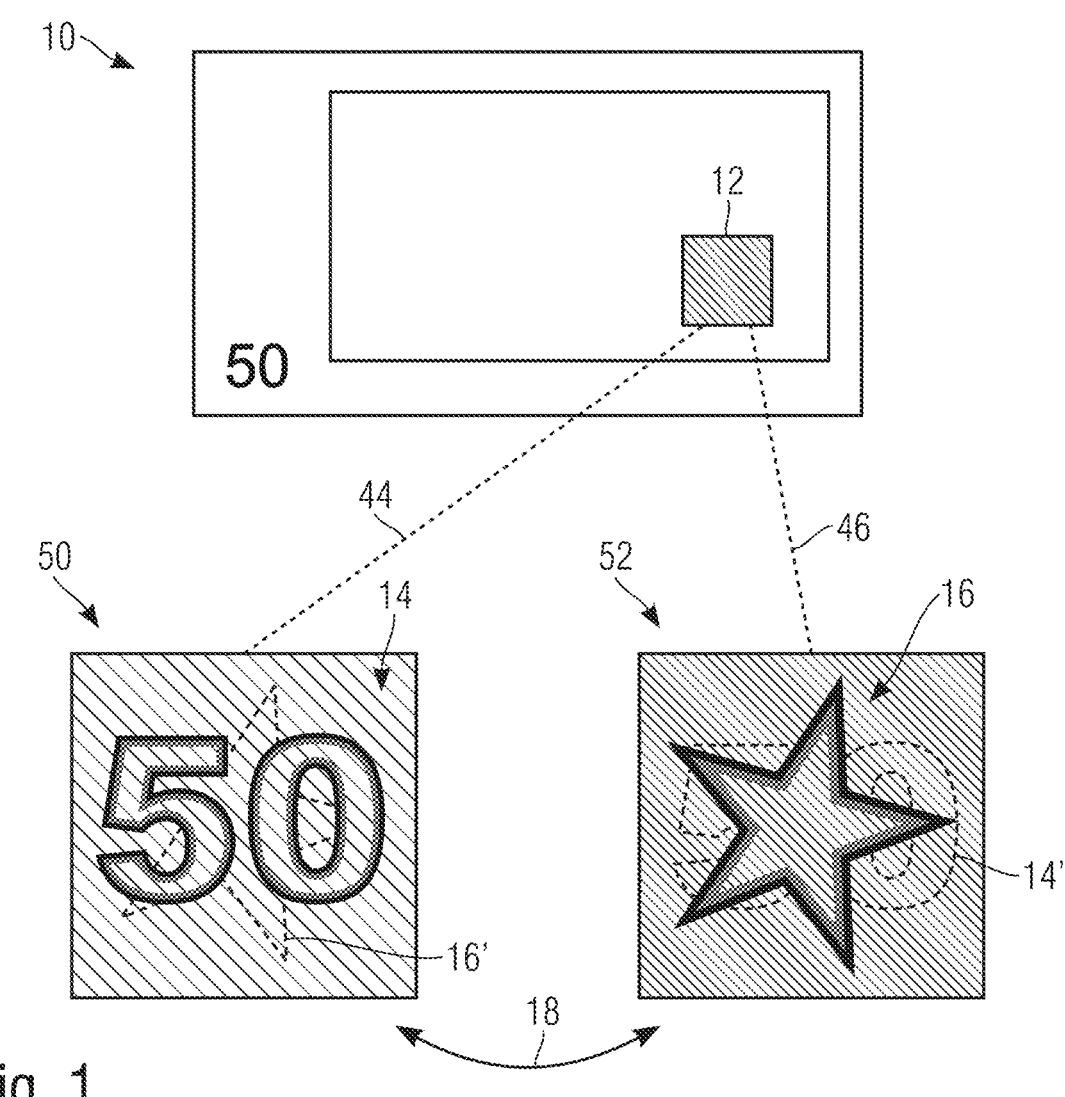
FIG. 1 shows a schematic representation of a banknote having an optically variable security element according to the invention.
FIG. 2 shows the structure of the security element of FIG. 1 schematically in cross section, FIG. 3, including FIGS. 3(*a*) to 3(*c*), 3(*a*) and 3(*b*) schematically show, to illustrate the more precise construction and the production of the security element, the profile of the modulated height functions of the two views of the security element of FIG. 1 and in 3(*c*) schematically shows the profile of the overall structuring after the interleaving of the modulated height functions.

The invention will now be explained on the basis of the example of security elements for banknotes. FIG. 1 shows for this purpose a schematic illustration of a banknote 10 having an optically variable security element 12 in the form of a stuck-on transfer element. However, it is apparent that the invention is not restricted to transfer elements and banknotes, but can be used in all types of security elements, for example, in labels on products and packages or in securing documents, identification cards, passports, credit cards, health insurance cards, and the like. In the case of banknotes and similar documents, in addition to transfer elements (such as patches or strips each with or without a separate carrier layer), for example, security threads or security strips also come into consideration. In addition to the use as a security element, the representation element according to the invention can also be used as a decorative element, for example, in the surface design of electrical appliances.

With reference to FIG. 1, the security element 12 applied to the banknote 10 is itself formed very flat, but nonetheless shows a view having a three-dimensional representation, which creates the impression of a motif apparently bulging out of the plane of the banknote 10, to an observer from each of at least two different observation directions 44, 46. The simulation of the reflection behavior of the motif bulging out is produced in this case by directed reflection. The two three-dimensional representations overlap one another and have different colors at least in some regions, so that a visually striking flip effect is displayed upon changing the observation direction, in which a color and motif change of the three-dimensional representations takes place simultaneously at the same location in the security element 12.

Specifically, the security element 12 can display, for example, upon observation from the left side as the first view 50 a three-dimensional value number 14 ("50"), which appears bulging out, in a blue color in front of a flat blue background, and can display upon observation from the right side as the second view 52 a three-dimensional star 16, which appears bulging out, in a yellow color in front of a flat yellow background. Upon changing the observation direction or upon tilting 18 the banknote 10 from the left to the right, the appearance of the security element 12 changes between the first view having the three-dimensional blue value number 14 and the second view having the three-dimensional yellow star 16. The two three-dimensional motifs 14, 16 moreover appear to overlap one another to the observer at the same location in the security element 12, as indicated by means of the outlines 14', 16' shown by dashed lines of the respective other motif in each of the views 50, 52.

The security element 12 thus displays a tilting behavior in which two different colored motifs are visible for an observer from two observation directions at the same location and the motif change upon tilting is linked with a simultaneous color change. Such a tilt effect is visually appealing and easy to memorize for a user. It also provides a high level of forgery protection, since a simulation of the effect, for example, by overprinting a reflective relief structure with glazing inks, is practically not possible using typical printing presses due to the requirement of maintaining the register between the reflective elements of the different motif views and the associated color.

As the following description of the structure of security elements according to the invention shows, nonetheless only one embossment and only a metallization are required and there is no need to use additional color layers. The security elements can be produced with a significant cost advantage in relation to known designs having two embossments and two metallizations or colored coatings, since the number of the material layers used and work steps in the manufacturing can be significantly reduced.

FIG. 2 shows the structure of the security element 12 schematically in cross section. An embossing lacquer layer 22 is applied to a carrier substrate 20, in which a relief structure in the form of a micromirror arrangement 26 is embossed in a surface region 24. The micromirror arrangement 26 is provided with a reflection-enhancing coating in the form of a metallization, for example, a 50 nm thick aluminum layer, which is not shown for the sake of clarity in FIG. 2.

As explained hereinafter in detail, the micromirror arrangement 26 contains two groups of micromirrors 34, 36, which are each inclined in relation to the plane of the surface region 24 so that they imitate the reflection behavior of the views 50, 52 having the three-dimensional motifs value number 14 or 16 for an observer 40 from each of the two observation directions 44, 46. The individual micromirrors 34, 36 have a linear dimension $1_M$ here between 5 μm and 50 μm and thus, for example, a square footprint of 10 μm×10 μm and are therefore not recognizable as such to an observer.

The different color effect of the views 50, 52 having the motifs 14, 16 is generated by overlaying the micromirror arrangement 26 with different subwavelength structures 38, as shown in the detail view 30 of FIG. 2. The color generated by the subwavelength structures 38 in reflection can be set by the selection of the structure parameters, in particular the grid period and the structure depth. The grid period of the subwavelength structures is between 200 nm and 400 nm and thus below the wavelength of visible light, the depth of the structures is between 50 nm and 400 nm.

Due to the modulation of the micromirror arrangement using the subwavelength structures, the subdivision of the relief structure 26 into a plurality of micromirrors 34, 36 can be viewed as rough structuring and the modulation of the micromirrors 34, 36 using the subwavelength structures 38 can be viewed as fine structuring of the relief structure 26.

With reference to FIG. 3, for example, the following procedure can be used in the production of the security element 12, wherein reference is made for further details of the rough structuring to document WO 2014/060089 A2, the content of the disclosure of which is insofar incorporated into the present application.

Firstly, the views having the three-dimensional motifs 14, 16 to be represented are each characterized by a height function h(x, y) of the location coordinates x and y in the plane. Reduced height functions are derived from these height functions, which each have the same local slope as the associated height function, but do not exceed a predetermined maximum height $h_{max}$. These reduced height functions each describe the profile of a micromirror arrangement, which simulates the reflection behavior of the motif 14 or 16 to be represented. The reduced height functions have a step profile having a maximum step height $h_{max}$ and having a step dimension $1_M$ in the plane of the surface region, the size of which corresponds to the dimensions of the subsequently created micromirrors 34, 36. For example, the step size of the reduced height functions is 10 μm×10 μm and the maximum step height is 10 μm.

The local slopes of the two reduced height functions are then rescaled and each provided with an offset, so that the scaled height function in each case describes the profile of a micromirror arrangement which simulates the reflection behavior of the motifs 14, 16 to be represented from one of the two different observation directions 44, 46. For example, with perpendicular light incidence, the first view 50 having the first three-dimensional motif 14 can appear at an oblique angle of approximately −53° (observation direction 44) and the second view 52 having the second three-dimensional motif 16 can appear at an angle of approximately +53° (observation direction 46). It can be ensured by the rescaling of the local slopes that the absolute value of the maximum slope does not exceed a predetermined maximum value in spite of the added offset. Since the step size $1_M$ is not changed by the rescaling, the step height therefore also remains restricted.

For the desired color effect, the scaled height functions are each overlaid with a grid function, which describes the relief profile of a subwavelength grid $g_1$ or $g_2$, and modulated height functions $m_1(x, y)$ or $m_2(x, y)$ are thus obtained. Specifically, for example, the scaled height function of the first view 50 is modulated using a subwavelength grid function $g_1$, which is designed to generate a blue reflection color, and the scaled height function of the second view 52 is modulated using a subwavelength grid function $g_2$, which is designed to generate a yellow reflection color. The grid constants of the two subwavelength grids $g_1$ and $g_2$ are between 200 nm and 400 nm, so that between 25 and 50 complete periods of the subwavelength structures have space on each micromirror (step dimension $1_M$=10 μm). The subwavelength structures therefore each generate very clear and pure colors.

FIG. 3 schematically shows for illustration in 3(*a*) and 3(*b*) the profile of the modulated height function $m_1(x, y)$ for the first view 50 having the first motif 14 and the profile of the modulated height function $m_2(x, y)$ for the second view 52 having the second motif 16, respectively, and the oblique observation directions 44, 46, from which the respective views appear to the observer 40. The modulation of the micromirror arrangement using the subwavelength grids $g_1$ and $g_2$ is only shown in each case in the detail representations 30, while the rough profile of the step profile of the scaled height function can be seen in each case in the relief profile shown un-magnified.

A common structuring r(x, y) for the profile of the relief structure 26 is then generated from the two modulated height functions of FIGS. 3(*a*) and 3(*b*) by interleaving, for example, in chessboard form. The common structuring r(x, y) represents the profile of an interleaved, modulated micromirror arrangement, which represents the first view 50 having the first three-dimensional motif 14 in a first color from a first observation direction 44 and represents the second view 52 having the second three-dimensional motif 16 in a second color from the second observation direction 46. The profile of the structuring r(x, y) is shown in FIG. 3(*c*), wherein the perpendicular arrows 64, 66 of FIG. 3(*b*) indicate which subregions of the relief structure 26 originate from the first modulated height function $m_1(x, y)$ of the first view 50 (arrows 64) and which originate from the second modulated height function $m_2(x, y)$ of the second view 52 (arrows 66).

As has been shown, human perception is oriented toward identifying slope changes within a motif 14, 16 corresponding to a curvature or bulge, while the absolute value of the slope, thus the tilt of the two motifs 14, 16 generated by the added offset, is less noticeable. If the structuring r(x, y) is thus embossed in an embossing lacquer layer and provided with a reflection-enhancing coating, the generated relief structure 26 thus displays the first view 50 having the first motif 14 in a blue color from the first observation direction 44 and displays the second view 52 having the second motif 16 in a yellow color from the second observation direction 46.

For example, perforated grids having periods and depths around 250 nm can be used as subwavelength structures, which are provided with a metallization, for example, in the form of an approximately 50 nm thick aluminum layer. The grid period, the grid depth, and the dimensions of the individual, for example, square or circular holes can be varied to generate different colors here.

With reference to FIGS. 4 to 6, not only can the colors of the first and second view as a whole differ, also the curved motifs and/or the flat background within a view can be formed having different colors or even each multicolored. One of the two bulging motifs or the flat background can also be formed without subwavelength structures and can then appear having the generally metallic color of the reflection-enhancing coating.

With reference to FIG. 4, for example, the first view 70 can display a value number 72 appearing curved in a blue color in front of a green background 74 and the second view 80 can display a star 82 appearing curved in a yellow color in front of a red background 84. Upon tilting 18 of the security element, the appearance changes between the first view 70 and the second view 80.

Two different-colored curved elements can also be visible within a three-dimensional motif, for example, in the curved motif of the first view, the value number "50" can be composed of a blue number "5" and a red number "0". It can also be provided that the color varies within an element appearing curved.

For example, the first view 90 shown in FIG. 5 contains a red value number 92 having a middle blue stripe 94 and a flat red background 96, wherein the colors of these regions are each generated by subwavelength structures of the above-described type. In the second view 100 of FIG. 5, the micromirrors are not modulated using subwavelength structures, so that the star 102 appearing curved and the flat background 104 each appear having the silvery metallic glossy color of the metallization of the micromirror arrangement. In this embodiment, the appearance of the security element changes between the first view having the three-dimensional red/blue value number 92, 94 in front of a red background and the second view having the three-dimensional metallic star 102 in front of a metallic background. Structurally, after the interleaving of the micromirrors of the two views 90, 100 in the overlap region, only the micromirrors of the first view are provided with subwavelength structures here, while the micromirrors of the second view are not modulated by subwavelength structures.

It can advantageously also be provided that the shape and size of the two represented three-dimensional motifs are identical and the motifs only differ in their color. For example, the security element of FIG. 6 contains a first view 110 having a value number 112 appearing curved in a red color in front of a metallic glossy flat background 114 and a second view 120 having the same value number 122 appearing curved in a green color in front of a metallic glossy flat background 124. The micromirrors of the security element are each provided here in the region of the curved value numbers 112, 122 with subwavelength structures for the desired color red or green, respectively, while the background region 114, 124 is formed in each case without modulating subwavelength structures. The observer therefore sees the curved value number "50" in each case upon tilting 18 of the security element, which is visible upon observation from the left with red color and upon observation from the right with green color in each case in front of the silver metallic background of an aluminum coating of the micromirror arrangement.

With three-dimensional motifs of the same shape, the color can advantageously also only change in a subregion of the motif upon tilting 18 and therefore particularly highlight this subregion.

Designs in which color profiles are generated by a continuous variation of the parameters of the subwavelength structures, in particular the period and/or depth thereof, also come into consideration. For example, a curved motif can have a color profile from red to green from top to bottom.

Designs are also conceivable in which the flip effect occurs in regions with different tilt angles and/or tilt axes. Thus, for example, in a first surface region an observation angle-dependent curve effect having a color change and possibly a motif change can be present upon north/south tilting and in a second surface region a further observation angle-dependent curve effect having a color change and possibly a motif change can occur upon east/west tilting.

In an alternative design, the tilt axes can be the same in the various surface regions, but the tilt angle can be different in each case, by which in particular movement effects may be implemented. Thus, upon tilting around a predetermined axis, for example, multiple first curved motifs, for example, three stars appearing curved in a yellow color, can change in succession into multiple second curved motifs differing therefrom having a different color, for example, three letters or value numbers appearing curved in a red color.

The invention claimed is:

1. An optically variable representation element having at least one reflective surface region, which generates a three-dimensional representation upon observation in reflected light for each of at least two different observation directions,
   wherein the three-dimensional representations at least partially overlap and have different colors at least in some regions in an overlap region, wherein
   the at least one reflective surface region, in a first and a second subregion, which at least partially overlap one another, contains in each case a plurality of reflective facets that are formed by a micromirror arrangement having directed reflective micromirrors, which are oriented so that
   the facets of the first subregion create a first three-dimensional representation having a first surface protruding and/or set back in relation to an actual spatial shape of the first surface for an observer from a first observation direction, and
   the facets of the second subregion create a second three-dimensional representation having a second surface protruding and/or set back in relation to an actual spatial shape of the second surface for the observer from a second observation direction, and
   the facets of the reflective surface region in the overlap region of the first and second subregion are provided at least in some regions with subwavelength structures, wherein the subwavelength structures create the different colors of the first and second three-dimensional representations,
   wherein the subwavelength structures are formed by periodic structures and a period length of the subwavelength structures and linear dimensions of the micromirrors are matched to one another so that at least 10 complete periods of the subwavelength structures have space on each micromirror.

2. The representation element according to claim 1, wherein the facets of the reflective surface region are provided with a reflection-enhancing coating.

3. The representation element according to claim 2, wherein the facets of the reflective surface region are provided with a reflection-enhancing coating with a metallization, a refractive layer, and/or a thin film structure.

4. The representation element according to claim 1, wherein the facets of the reflective surface region are formed in an embossing lacquer layer.

5. The representation element according to claim 4, wherein the embossing lacquer layer is a thermoplastic or radiation-curing embossing lacquer layer.

6. The representation element according to claim 1, wherein the subwavelength structures are formed by periodic structures having a period length between 100 nm and 500 nm, and/or a depth between 50 nm and 400 nm.

7. The representation element according to claim 1, wherein the subwavelength structures are formed by one-dimensional grids or by two-dimensional grids.

8. The representation element according to claim 7, wherein the subwavelength structures have rectangular, square, hexagonal, or parallelogram-shaped grid symmetry.

9. The representation element according to claim 1, wherein at least two subwavelength structures are provided for creating the different colors, wherein the at least two subwavelength structures differ in period length and/or their-depth and/or profile shape.

10. The representation element according to claim 1, wherein the subwavelength structures for the different colors of the first and second three-dimensional representations are arranged in register with the facets of the reflective surface region, so that each facet is only covered by a respective specific type of subwavelength structures wherein the respective specific type of wavelength structures is characteristic for a respective color.

11. The representation element according to claim 1, wherein each color visible to an observer upon observation of the representation element is created by a respective specific type of subwavelength structures, wherein the respective specific type of subwavelength structures is characteristic for a respective color.

12. The representation element according to claim 1, wherein each color visible to an observer upon observation of the representation element contains mixed colors, which arise due to color mixing of colors of pixel-shaped partial regions having a dimension below a resolution limit of a human eye, and in which the colors of the pixel-shaped partial regions are each created by a respective specific type of subwavelength structures, wherein the respective specific type of subwavelength structure is characteristic for a respective color.

13. The representation element according to claim 1, wherein, in the overlap region, both the facets of the first subregion and the facets of the second subregion are provided at least in some regions with subwavelength structures, which create the different colors of the first and second three-dimensional representations.

14. The representation element according to claim 1, wherein the three-dimensional representations have different shapes and/or sizes.

15. The representation element according to claim 1, wherein the representation element is a security element for securing value objects.

16. The representation element according to claim 1, wherein the facets of the reflective surface region are formed by micromirrors having a linear dimension between 3 μm and 100 μm.

17. An optically variable representation element having at least one reflective surface region, which generates a three-dimensional representation upon observation in reflected light for each of at least two different observation directions, wherein the three-dimensional representations at least partially overlap and have different colors at least in some regions in an overlap region, wherein the at least one reflective surface region, in a first and a second subregion, which at least partially overlap one another, contains in each case a plurality of reflective facets, which are oriented so that the facets of the first subregion create a first three-dimensional representation having a first surface protruding and/or set back in relation to an actual spatial shape of the first surface for an observer from a first observation direction, and the facets of the second subregion create a second three-dimensional representation having a second surface protruding and/or set back in relation to an actual spatial shape of the second surface for the observer from a second observation direction, and the facets of the reflective surface region in the overlap region of the first and second subregion are provided at least in some regions with subwavelength structures, wherein the subwavelength structures create the different colors of the first and second three-dimensional representations, wherein the first and second three-dimensional representations have a same shape and size and are arranged congruently, so that the three-dimensional representations only differ from the at least two different observation directions due to the color differing at least in some regions.

18. An optically variable representation element having at least one reflective surface region which generates a three-dimensional representation upon observation in reflected light for each of at least two different observation directions, wherein the three-dimensional representations at least partially overlap and have different colors at least in some regions in an overlap region, wherein the at least one reflective surface region, in a first and a second subregion, which at least partially overlap one another, contains in each case a plurality of reflective facets, which are oriented so that the facets of the first subregion create a first three-dimensional representation having a first surface protruding and/or set back in relation to an actual spatial shape of the first surface for an observer from a first observation direction, and the facets of the second subregion create a second three-dimensional representation having a second surface protruding and/or set back in relation to an actual spatial shape of the second surface for the observer from a second observation direction, and the facets of the reflective surface region in the overlap region of the first and second subregion are provided at least in some regions with subwavelength structures, wherein the subwavelength structures create the different colors of the first and second three-dimensional representations, wherein the first and second subregion are interleaved with one another, wherein the subregions are formed by a plurality of strips arranged alternately adjacent to one another or by partial regions interleaved with one another in two dimensions.

* * * * *